UNITED STATES PATENT OFFICE.

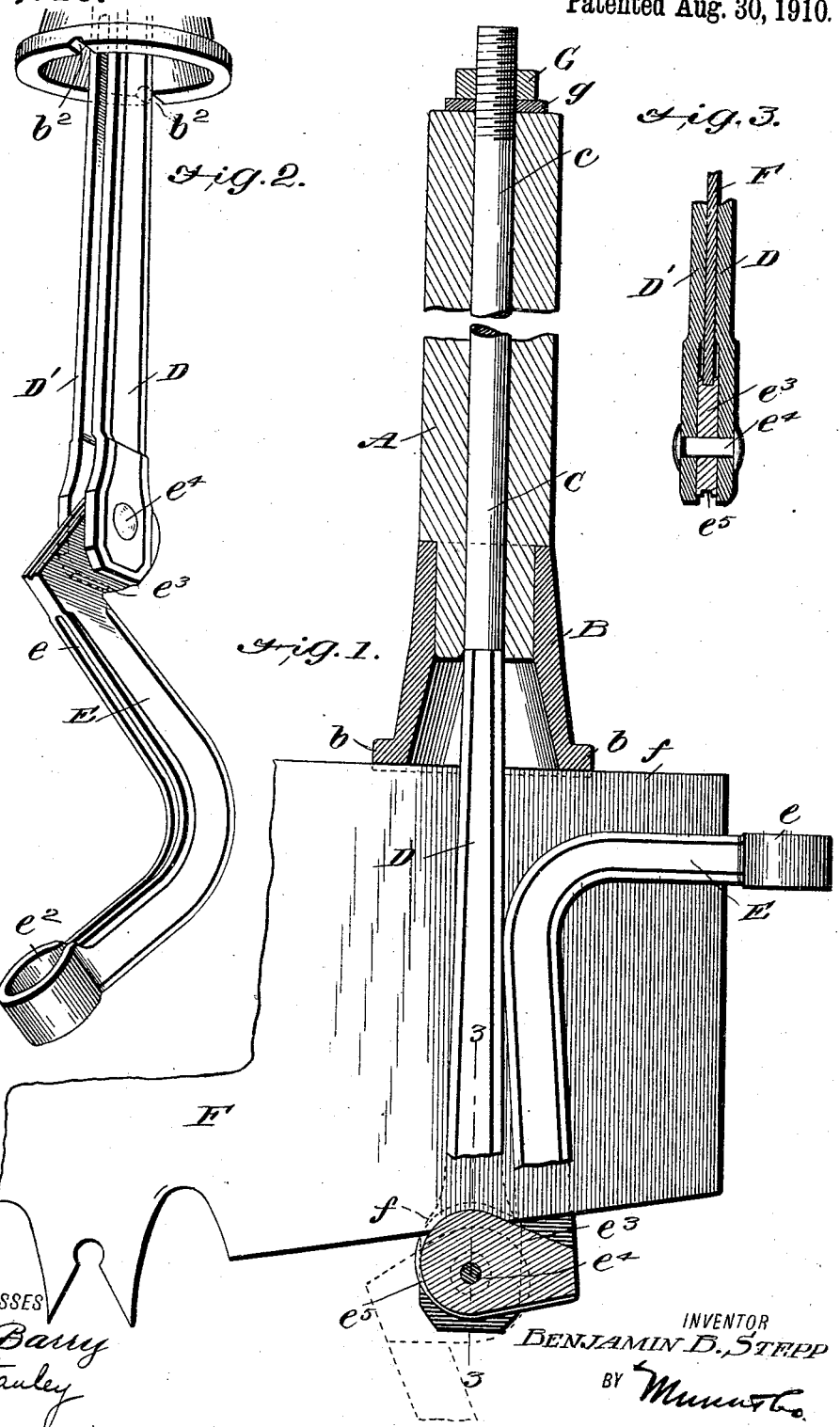

BENJAMIN B. STEPP, OF CARYVILLE, TENNESSEE.

SAW-HANDLE.

968,710.

Specification of Letters Patent. Patented Aug. 30, 1910.

Application filed March 10, 1909. Serial No. 482,469.

*To all whom it may concern:*

Be it known that I, BENJAMIN B. STEPP, a citizen of the United States, and a resident of Caryville, in the county of Campbell and State of Tennessee, have made certain new and useful Improvements in Saw-Handles, of which the following is a specification.

My invention relates to improvements in removable handles and is especially applicable to large saws for cutting heavy timber, and it consists in the constructions, combinations and arrangements hereinafter described and claimed.

In the cutting of timber, and especially of standing timber, the operator often has need for a saw handle which can be quickly removed. Thus it often happens that in sawing standing timber, the tree begins to fall and if the saw is left in the cut it will be ruined. Many times it is impossible to remove the saw without first removing the handle and, as in the majority of cases this takes considerable time, a great many saws are necessarily destroyed. In order to overcome this objection, saws have been provided with removable handles, these handles being usually secured to the saw by means of nuts or other devices requiring the use of extra tools so that it is required to remove the handles.

The main object of my invention is to provide a saw handle which can be instantly removed, thereby enabling the wood cutter to save a saw from being broken, which otherwise he could not save.

A further object of my invention is to provide a saw handle which may readily be applied to the saw and which may be as rigidly secured thereto as if it were permanently secured to the saw.

Other objects and advantages will appear in the following specification and the novel features of the device will be particularly pointed out in the appended claims.

My invention is illustrated in the accompanying drawings, in which—

Figure 1 is a side view of a portion of the saw and handle, part of the handle being shown in section. Fig. 2 is a perspective view of the clamping mechanism, and Fig. 3 is a sectional view on the line 3—3 of Fig. 1.

In carrying out my invention I provide a grip A, which is preferably made of wood but may be made of metal or other material as desired. This grip is provided with a ferrule B on its lower end having a bottom flange $b$ which is slotted at $b^2$ as clearly shown in Fig. 2. The grip is hollow and is arranged to receive the rounded portion $c$ of a rod C. The lower part of this rod C terminates in a fork comprising the two members D and D′, which are flattened in the manner shown in Figs. 2 and 3. The clamping member proper is most clearly shown in Fig. 2. It consists of an L-shaped member E having a central slot $e$. On one end the lever is formed in the shape of a loop $e^2$, while on the other end it is provided with an extension $e^3$. The extension $e^3$ is disposed between the ends of the forked members D and D′ and is eccentrically pivoted to these members by means of the pivot bolt $e^4$. The extension $e^3$ is provided with a slot $e^5$ on its curved portion, which is adapted to receive the saw blade as will be hereinafter explained.

From the foregoing explanation of the various parts of the device, the operation thereof may be readily understood. The saw blade F is preferably provided with a recessed portion $f$ on its lower side at the place that the handle is to occupy. The clamping mechanism is turned down in the position shown in Fig. 2. The end of the saw blade F is now inserted between the forks D and D′ and brought into position with the recessed portion just above the pin $e^4$. The grip A is now turned until the slots $b^2$ are in alinement with the upper edge $f′$ of the saw. The clamping member E is now brought upwardly into the position shown in Fig. 1, the end of the saw passing through the slot $e$ in the clamping member. In this position the bottom part of the saw has entered the groove $e^5$ and the blade is firmly clamped by the eccentric between the latter and the lower part $b$ of the ferrule B on the grip A. It will be observed that the rod $c$ is threaded at its upper end and that I have provided a nut G and a washer $g$. The nut is for the purpose of regulating the tension of the eccentric $e^3$, so that any wear or any difference in the widths of the saws may be compensated for by means of this adjustable feature. With the handle clamped to the saw as above described, the only work required for its instant removal is to grasp the projecting loop $e^2$ and to swing it away from the forked members D and D′. This relieves the grip on the saw blade and the handle can be immediately pulled off and the saw removed from the tree, thereby obviating all danger of damage.

I claim—

1. The combination with a saw blade, of a removable handle therefor comprising a grip, a rod arranged to pass through the center of the grip and having a forked end, an eccentric pivoted to said forks, a slotted lever secured to said eccentric, said lever having a laterally extending portion constituting a handle, said saw blade being arranged to pass between the forked ends of the rod and to be clamped between the eccentric and said grip by a movement of the lever, said lever being arranged to straddle the saw blade with its end projecting beyond the end of the blade.

2. As an article of manufacture, a removable saw handle comprising a grip, a rod arranged to pass through the center of the grip and having a forked end, an eccentric pivoted to said forked end a slotted lever secured to said eccentric, said lever having a bent end containing a portion of the slot, and terminating in a handle, the forked end of said rod being arranged to straddle the saw blade, and said slotted lever being arranged to swing toward and to straddle the end of the saw blade, whereby the saw blade is clamped between the eccentric and the grip.

BENJAMIN B. STEPP.

Witnesses:
J. S. Stone,
A. F. Shults.